(12) United States Patent
Kim et al.

(10) Patent No.: US 12,384,618 B2
(45) Date of Patent: Aug. 12, 2025

(54) CYLINDRICAL MATERIAL STORING DEVICE AND METHOD THEREOF

(71) Applicant: SAMSUNG SDS CO., LTD., Seoul (KR)

(72) Inventors: Seung Young Kim, Seoul (KR); Sung Hoon Won, Seoul (KR); In Sup Um, Seoul (KR); Won Yong Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 11 days.

(21) Appl. No.: 18/491,170

(22) Filed: Oct. 20, 2023

(65) Prior Publication Data

US 2024/0051746 A1 Feb. 15, 2024

Related U.S. Application Data

(63) Continuation of application No. 17/739,368, filed on May 9, 2022, now Pat. No. 11,834,267.

(30) Foreign Application Priority Data

May 7, 2021 (KR) ........................ 10-2021-0059012

(51) Int. Cl.
*B65G 1/04* (2006.01)
*A47B 81/00* (2006.01)
*B65H 67/06* (2006.01)

(52) U.S. Cl.
CPC ......... *B65G 1/0421* (2013.01); *B65G 1/0485* (2013.01); *A47B 81/007* (2013.01); *B65H 67/066* (2013.01); *B65H 67/067* (2013.01)

(58) Field of Classification Search
CPC ........ Y10S 414/124; B66F 9/141; B66F 9/07; B65H 67/068; B65H 67/067;
(Continued)

(56) References Cited

U.S. PATENT DOCUMENTS 5,437,530 A * 8/1995 Beckmann ............. B65G 1/133
414/908
6,155,516 A * 12/2000 Lehrieder .............. B65H 19/12
242/559.3
(Continued)

FOREIGN PATENT DOCUMENTS

JP 52-47278 A 4/1977
JP 61-217410 A 9/1986
(Continued)

OTHER PUBLICATIONS

Communication dated Jul. 26, 2023, issued by the Korean Patent Office in Korean Application No. 10-2021-0059012.
(Continued)

*Primary Examiner* — Kaitlin S Joerger
(74) *Attorney, Agent, or Firm* — Sughrue Mion, PLLC

(57) ABSTRACT

A device for storing cylindrical material according to an embodiment of the present disclosure includes a rack shelf including one or more racks in which a circular axis is stored, a rack master including a first rack master fork configured to collect a first circular axis in which an article stored in a target rack is not mounted, and a second rack master fork configured to transport a second circular axis in which the article is mounted in the target rack from which the first circular axis is collected, a turn skid configured to collect the first circular axis collected from the first rack master fork; and an input/output port configure to mount the article in the first circular axis collected from the turn skid.

20 Claims, 12 Drawing Sheets

(58) Field of Classification Search
CPC .......... B65H 67/066; B65H 2405/4225; B65H 2405/4223; B65G 1/0485; B65G 1/0435; B65G 1/0421; B65G 1/0407; A47B 81/007
USPC ......................................................... 414/911
See application file for complete search history.

(56) References Cited

U.S. PATENT DOCUMENTS

| | | | |
|---|---|---|---|
| 7,703,259 B2* | 4/2010 | Lindberg | B65B 25/148 53/167 |
| 8,011,871 B2* | 9/2011 | Lehrieder | B65H 19/126 242/560 |
| 9,944,464 B2 | 4/2018 | Ueda et al. | |
| 2007/0108336 A1* | 5/2007 | Benvenuti | B65H 19/30 242/533.8 |

FOREIGN PATENT DOCUMENTS

| | | |
|---|---|---|
| JP | 62-126001 A | 6/1987 |
| JP | 7-076403 A | 3/1996 |
| JP | 2554566 B2 | 11/1996 |
| JP | H09-2611 A | 1/1997 |
| JP | 2001-058704 A | 3/2001 |
| JP | 3556573 B2 | 8/2004 |
| JP | 2007-62973 A | 3/2007 |
| JP | 2007-137605 A | 6/2007 |
| JP | 4614096 B2 | 1/2011 |
| JP | 4844811 B2 | 12/2011 |
| JP | 2012-206807 A | 10/2012 |
| JP | 5472180 B2 | 4/2014 |
| JP | 5578350 B2 | 8/2014 |
| JP | 2017-222440 A | 12/2017 |
| KP | 10-0886798 B1 | 3/2009 |
| KP | 10-2012-0023568 A | 3/2012 |
| KR | 20-2009-0005969 U | 6/2009 |
| KR | 10-2014-0065058 A | 5/2014 |
| WO | WO-2017220285 A1 * 12/2017 ........... B65G 1/0407 |

OTHER PUBLICATIONS

Communication dated Sep. 3, 2024, issued by the European Patent Office in counterpart European Application No. 22171724.2.
Communication dated Jan. 22, 2024, issued by the Korean Patent Office in Korean Application No. 10-2021-0059012.

* cited by examiner (a)

(b)

(a)

(b)

(c)

(a)

(b)

(a)

(b)

CYLINDRICAL MATERIAL STORING DEVICE AND METHOD THEREOF

CROSS-REFERENCE TO RELATED APPLICATION

This application is a continuation application of U.S. Ser. No. 17/739,368, filed on May 9, 2022, which claims priority from Korean Patent Application No. 10-2021-0059012 filed on May 7, 2021 in the Korean Intellectual Property Office, and all the benefits accruing therefrom under 35 U.S.C. 119, the contents of which in its entirety are herein incorporated by reference.

BACKGROUND

1. Technical Field

The present disclosure relates a device for storing a cylindrical material and a method thereof. More specifically, the present disclosure relates to a method for automatizing storage of a cylindrical material using a circular axis and a method thereof.

2. Description of the Related Art

Cylindrical material refers to a cylindrical article around which a fabric or the like is wound based on a cylinder provided in the center thereof. For example, the cylindrical material may include a reel, a roll, a wide roll, and a jumbo roll. In this case, an electrode required for battery production may be wound around the cylindrical material.

The conventional technology for storing such a cylindrical material depends on a worker's manual labor. Therefore, since bulky and heavy cylindrical materials are manually stored, there is a problem in that it is not easy to receive and discharge the cylindrical materials. In addition, when the worker contacts the surface of the fabric wound around the cylindrical material, it may adversely affect the quality of the product that will be manufactured using the fabric.

Therefore, there is a need for a technology of efficiently storing the cylindrical materials by automating the storage of the cylindrical materials and increasing the load amount of the cylindrical materials.

SUMMARY

Technical aspects to be achieved through one embodiment by the present disclosure provide a device for automatizing material flow and a method thereof.

Technical aspects to be achieved through other embodiments by the present disclosure also provide a device for reducing wastage of manpower caused by manual labor and a method thereof.

Technical aspects to be achieved through still other embodiments by the present disclosure also provide a device for preventing safety accidents that may occur during storage and transport of articles and a method thereof.

Technical aspects to be achieved through still other embodiments by the present disclosure also provide a device for efficiently maintaining the quality of articles and a method thereof.

The technical aspects of the present disclosure are not restricted to those set forth herein, and other unmentioned technical aspects will be clearly understood by one of ordinary skill in the art to which the present disclosure pertains by referencing the detailed description of the present disclosure given below.

According to an aspect of the inventive concept, there is provided a device for storing a cylindrical material, may comprise a rack shelf including one or more racks in which a circular axis is stored, a rack master including a first rack master fork configured to collect a first circular axis in which an article stored in a target rack is not mounted, and a second rack master fork configured to transport a second circular axis in which the article is mounted in the target rack from which the first circular axis is collected, a turn skid configured to collect the first circular axis collected from the first rack master fork, and an input/output port configured to mount the article in the first circular axis collected from the turn skid.

In some embodiments, the input/output port may comprise a shaft rotatably coupled to a body in an integral form, and a first pusher configured to output the article mounted in the shaft to the turn skid.

In some embodiments, the shaft may be to which an article is mounted from an automatic guided vehicle.

In some embodiments, the shaft may rotate integrally with the body at a predetermined angle so that a longitudinal direction of the shaft matches a longitudinal direction of the first circular axis collected in the turn skid.

In some embodiments, the input/output port may comprise a first sensor configured to sense the number of articles mounted in the shaft, and a second sensor configured to sense a match between the longitudinal direction of the shaft and the longitudinal direction of the first circular axis, wherein the first pusher may output the article in the shaft to the turn skid based on a signal of the first sensor and a signal of the second sensor.

In some embodiments, the turn skid may comprise a first movement part that moves between a designated location and a circular axis collection location, and a clamp configured to fix the first circular axis stored in the first rack master fork.

In some embodiments, the clamp may fix and secure the first circular axis when the turn skid is disposed at the circular axis collection location, and the first movement part may move to the designated location when the first circular axis is fixed by the clamp.

In some embodiments, the clamp may be a V-Block clamp.

In some embodiments, the turn skid may further comprise a second movement part that moves between the designated location and an article collection location, wherein the second movement may move to the article collection location when the first circular axis is fixed by the clamp and the turn skid is disposed at the designated location.

In some embodiments, the turn skid may further comprise a third sensor configured to sense the number of articles mounted in the first circular axis fixed in the clamp, a fourth sensor configured to sense a mounted location of the article mounted in the first circular axis fixed in the clamp, and an arrangement pusher configured to arrange the mounted location of the article mounted in the first circular axis, based on a signal of the third sensor and a signal of the fourth sensor.

In some embodiments, a collection operation of the first rack master fork and a transport operation of the second rack master fork may be continuously performed.

In some embodiments, the rack master may further comprise a vertical movement part configured to vertically move the rack master fork.

In some embodiments, the vertical movement part may vertically move a pair of rack master forks including the first rack master fork and the second rack master fork at a time.

In some embodiments, the rack master may further comprise a fifth sensor configured to sense a storage location of the rack, and the vertical movement part may vertically move the rack master fork based on a signal of the fifth sensor.

In some embodiments, each of a plurality of rack master forks including the first rack master fork and the second master fork may further comprise a fork in which the circular axis is stored, an extension bar extending integrally to the fork so that the fork moves to the storage location of the rack, and a third movement part that moves along a path provided in the rack shelf.

In some embodiments, the fork may have a V-Block structure.

In some embodiments, the rack master may comprise a sixth sensor configured to sense the storage location of the rack, and the extension bar may extend integrally to the fork so that the fork moves to the storage location, based on the signal of the sixth sensor.

In some embodiments, the third movement part of the first rack masker fork may move to a circular axis collection location along the path, when the first circular axis stored in the rack is collected by the first rack master fork.

According to another aspect of the inventive concept, there is provided a device for storing a cylindrical material, may comprise a rack shelf including one or more having in which a circular axis is stored, a rack master including a third rack master fork configured to collect a third circular axis in which an article stored in a target rack is mounted, and a fourth rack master fork configured to transport a fourth circular axis in which the article is not mounted in the target rack from which the third circular axis is collected, a turn skid configured to collect the third circular axis collected from the third rack master fork, and an input/output port configured to collect the article from the third circular axis collected from the turn skid.

In some embodiments, the turn skid may comprise a second pusher configured to output the article mounted in the third circular axis to the input/output port.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
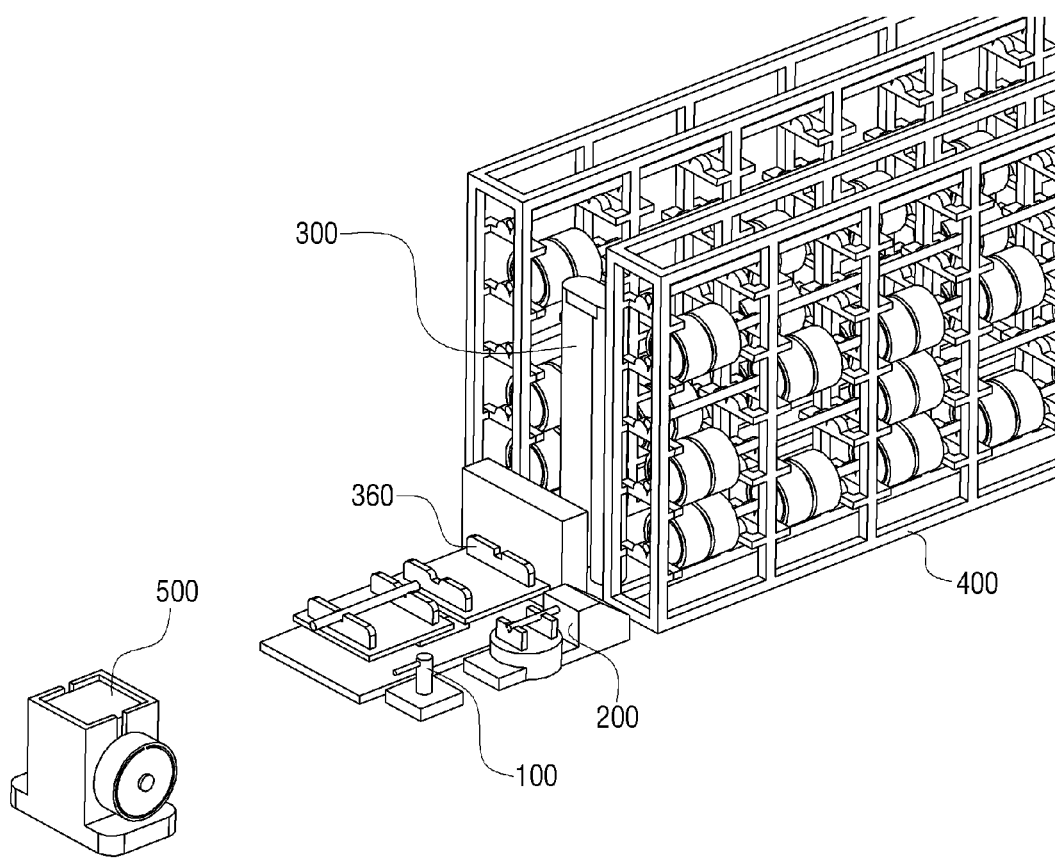
FIG. 1 is a view illustrating exemplary environment to which a cylindrical material storing device according to one embodiment of the present disclosure may be applied.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings:

FIG. 1 is a view illustrating exemplary environment to which a cylindrical material storing device according to one embodiment of the present disclosure may be applied. Even though FIG. 1 illustrates the environment to which one automated guided vehicle 500 is applied, this is only an example, and any number of automated guided vehicles 500 may be changed.

The cylindrical material storing device according to one embodiment of the present disclosure illustrated in FIG. 1 may include an input/output port 100, a turn skid 200, a rack master 300, and a rack shelf 400. In addition, the cylindrical material storing device may further include a controller configured to control each component constituting the cylindrical material storing device. On the other hand, it should be noted that FIG. 1 illustrates only a preferred embodiment for achieving the purpose of the present disclosure, where some components may be added or removed if necessary. Hereinafter, each of the component constituting the cylindrical material storing device will be described with reference to FIG. 1.

The input/output port 100 may collect an article, for example, a reel, from the automated guided vehicle 500. Furthermore, the input/output port 100 may output the article to the automated guided vehicle 500.

The input/output port 100 may collect the article from the automated guided vehicle 500 and output the article to the turn skid 200. In addition, in order to output the article to the automated guided vehicle 500, the input/output port 100 may collect the article from the turn skid 200. A structure of the input/output port 100 and operations performed by the input/output port 100 will be described in more detail later with reference to FIGS. 2 and 3.

The turn skid 200 may collect a circular axis from a rack master fork 360. In this case, the article may not be mounted in the circular axis or the article may be mounted therein. When the article is not mounted in the circular axis collected by the turn skid 200, the turn skid 200 may collect the article from the input/output port 100. On the other hand, when the article is mounted in the circular axis collected by the turn skid 200, the turn skid 200 may output the article mounted in the circular axis to the input/output port 100.

The turn skid 200 may output the circular axis to the rack master fork 360. When the article is mounted in the circular axis from the input/output port 100, the turn skid 200 may output the circular axis in which the article is mounted, to the rack master fork 360. On the other hand, when the article mounted in the circular axis is output to the input/output port 100, the turn skid 200 may output the circular axis in which the article is not mounted, to the rack master fork 360. The structure of the turn skid 200 and operations performed by the turn skid 200 will be described in more detail later with reference to FIGS. 4 to 8.

The rack master fork 360 included in the rack master 300 may output the circular axis to the turn skid 200. Furthermore, the rack master fork 360 may collect the circular axis from the turn skid 200.

In the reception operation of the article, the rack master fork 360 may output the circular axis in which the article is not mounted, to the turn skid 200, and when the article is mounted to the output circular axis, the circular axis in which the article is mounted may be collected from the turn skid 200. On the other hand, in the discharging operation of the article, the rack master fork 360 may output the circular axis in which the article is mounted, to the turn skid 200, and, when outputting the article mounted in the output circular axis, the rack master fork 360 may collect the circular axis in which the article is not mounted, from the turn skid 200.

The rack master 300 may include a plurality of rack master forks. The rack master 300 may output and collect the circular axis to the turn skid 200 using the plurality of rack master forks. Furthermore, the rack master 300 may output and collect the circular axis to the rack shelf 400 using the plurality of rack master forks. The structure of the rack master 300 and operations performed by the rack master 300 will be described in more detail later with reference to FIGS. 9 to 11.

The rack shelf 400 may include a plurality of racks. Each of the plurality of racks included in the rack shelf 400 may store the circular axis. In this case, the article may not be mounted in the circular axis or the article may be mounted therein. The structure of the rack shelf 400 will be described later in more detail with reference to FIGS. 9 to 11.

So far, the exemplary environment to which the cylindrical material storing device according to one embodiment of the present disclosure may be applied has been described with reference to FIG. 1. Hereinafter, each of the components constituting the cylindrical material storing device will be described in more detail with reference to FIGS. 2 to 11.

Hereinafter, a first circular axis refers to a circular axis in which the article is not mounted, which is collected from a target rack in the reception operation of the article, and a second circular axis refers to a circular axis in which the article is mounted, which is transported to the target rack in the reception operation of the article. According to the description of the specification to be explained in detail, it is preferable that the first circular axis in which the article is mounted from the input/output port 100 should be changed to the second circular axis and thus indicate the first circular axis; however, for convenience of understanding, even though the article is mounted in the first circular axis, it will be referred to as the first circular axis.

Similarly, a third circular axis refers to a circular axis in which the article is mounted, which is collected from the target rack in the discharging operation of the article, and a fourth circular axis refers to a circular axis in which the article is not mounted, which is transported to the target rack in the discharging operation of the article. According to the description of the specification to be explained in detail, it is preferable that when the article mounted in the third circular axis is output to the input/output port 100, it should be changed to the fourth circular axis and thus indicate the third circular axis; however, for convenience of understanding, in spite of releasing the mounting of the article from the third circular axis, it will be referred to as the third circular axis.

Figure 2:
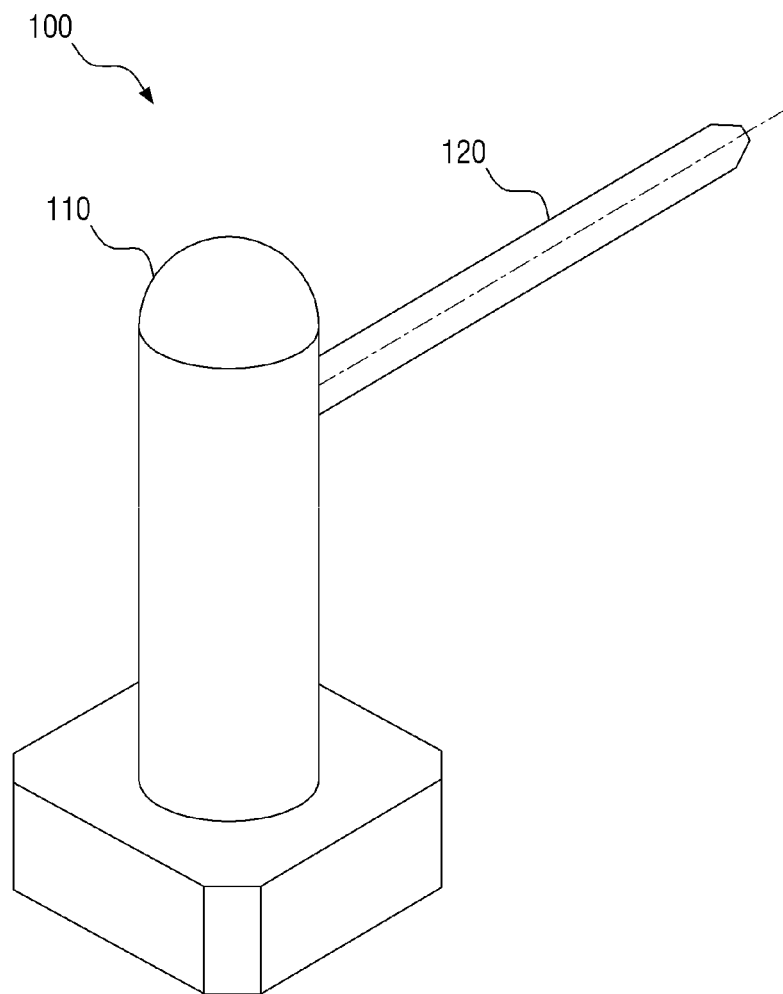
FIG. 2 is a view explaining in more detail an input/output port described with reference to FIG. 1.

FIG. 2 is a view for explaining an output and output port described with reference to FIG. 1.

The input/output port 100 may include a shaft 120 rotatably coupled to the body 110 in an integral form. Herein, the article output from the automated guided vehicle may be mounted in the shaft 120. In addition, the article output from the turn skid 200 may be mounted in the shaft 120.

The shaft 120 may rotate integrally with the body 110 by using the body 110 as a rotary axis. The rotation operation of the input/output port 100 will be described in more detail with reference to FIG. 3.

Figure 3:
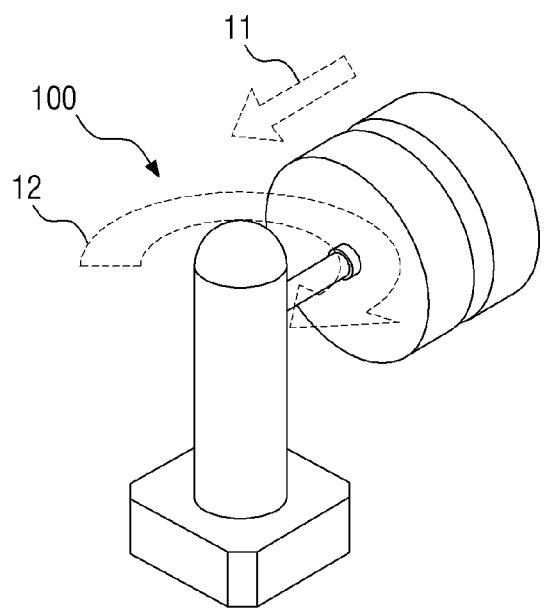
FIG. 3 is a view explaining in more detail an operation which the input/output port described with reference to FIG. 2 may perform.
Figure 3:
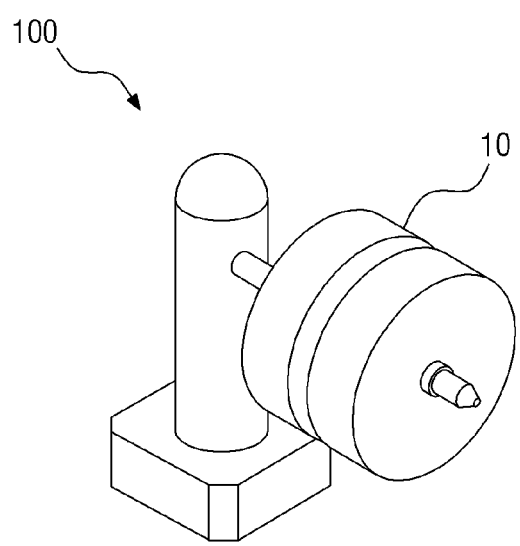

(a) of FIG. 3 illustrates one example of the input/output port 100 in which the article 10 is mounted. The article 10 output from the automated guided vehicle may be mounted in the shaft 120 towards the inside 11 of the shaft. In this case, the shaft 120 may rotate 12 integrally with the body 110 by using the body 110 as the rotary axis.

In some embodiments related to the shaft 120, the shaft 120 may rotate integrally with the body 110 at a predetermined angle so that a longitudinal direction of the shaft 120 matches a longitudinal direction of the first circular axis collected by the turn skid 200. Herein, the predetermined angle may vary depending on the received and discharged locations of the automated guided vehicle, the location of the input/output port 100, and the location of the turn skid 200. Referring to (a) and (b) of FIG. 3, it may be understood that the shaft 120 may rotate integrally with the body 110.

In addition, the shaft 120 may rotate integrally with the body 110 at the predetermined angle so that the longitudinal direction of the shaft 120 matches the longitudinal direction of the third circular axis collected by the turn skid 200. In this case, when the article is released, the shaft 120 and the third circular axis may be arranged so that the article mounted in the third circular axis moves to the inside of the shaft 120.

The input/output port 100 may include a first pusher. Herein, the first pusher may output the article mounted in the shaft to the turn skid 200. Furthermore, the first pusher may output the article mounted in the shaft to the automated guided vehicle. The first pusher may be implemented to perform the operation of outputting the article mounted in the shaft 120. In this case, all known techniques may be applied to implement the first pusher. For example, a hydraulic pusher provided with a hydraulic cylinder may be used, but the present disclosure is not limited thereto.

The input/output port 100 may include a first sensor configured to sense the number of articles mounted in the shaft 120 and a second sensor configured to sense a match between the longitudinal direction of the shaft and the longitudinal direction of the first circular axis. In this case, the second sensor may sense a match between the longitudinal direction of the shaft and the longitudinal direction of the shaft of the automated guided vehicle.

Herein, the first pusher may output the article mounted in the shaft to the turn skid 200 based on a signal of the first sensor and a signal of the second sensor. In addition, the first pusher may output the article mounted in the shaft to the automated guided vehicle based on the signal of the first sensor and the signal of the second sensor. According to the present embodiment, the operation of the first pusher may be controlled according to the number of articles mounted in the shaft 120. In addition, the operation of the first pusher may be controlled by determining whether the shaft 120 matches the direction of the first circular axis, or the operation of the first pusher may be controlled by determining whether the shaft 120 matches the direction of the shaft provided in the automated guided vehicle, thereby allowing the article mounted in the shaft 120 to safely move to the first circular axis or the shaft provided in the automated guided vehicle.

Each of the first sensor and the second sensor may be camera sensors, but the present disclosure is limited thereto, and any sensor for the purpose of implementing the operations of each sensor may be used.

Figure 4:
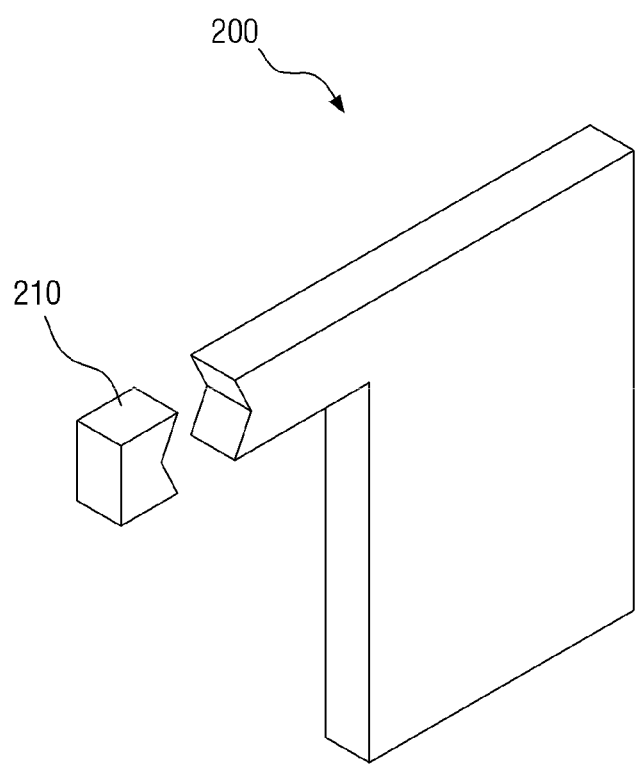
FIG. 4 is a view explaining in more detail a turn skid described with reference to FIG. 1.

FIG. 4 is a diagram for describing the turn skid 200 described with reference to FIG. 1 in more detail.

The turn skid 200 may include a clamp 210 configured to fix the first circular axis stored in a first rack master fork. In this case, all known techniques may be applied to implement the clamp 210. For example, a V-Block clamp may be used. In this way, it may be understood that when the V-Block clamp is used, this may prevent separation of the circular axis having a cylindrical structure. However, it should be noted that the present disclosure is not limited to this example. The clamp 210 may fix the third circular axis stored in the third rack master fork when discharging the article.

In order to explain the circular axis collecting operation of the turn skid 200 in more detail, a further explanation will be described with reference to FIG. 5. It may be understood that even though FIG. 5 illustrates one example of an operation of the turn skid 200 configured to collect the first circular axis, the same operation may be performed to collect the third circular axis with reference to FIG. 5.

The turn skid 200 may include a first movement part that moves between a designated location and a circular axis collection location. Referring to (a) of FIG. 5, the first movement part of the turn skid 200 may move in the direction of circular axis collection location 21 from the designated location. In this case, all known techniques may be applied to implement the first movement part. For example, rails and wheels may be used, but the present disclosure is not limited thereto.

Figure 5:
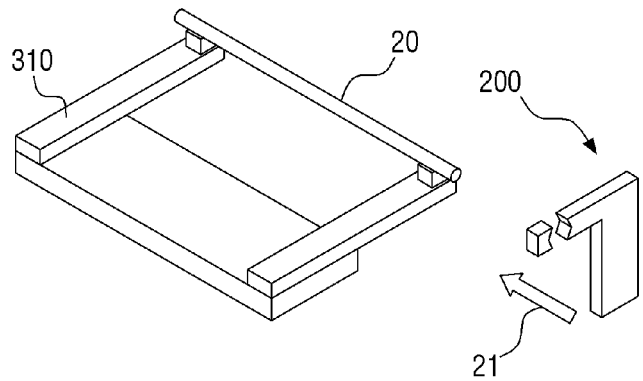
FIGS. 5 to 7 are views explaining in more detail an operation which the turn skid described with reference to FIG. 4 may perform.
Figure 5:
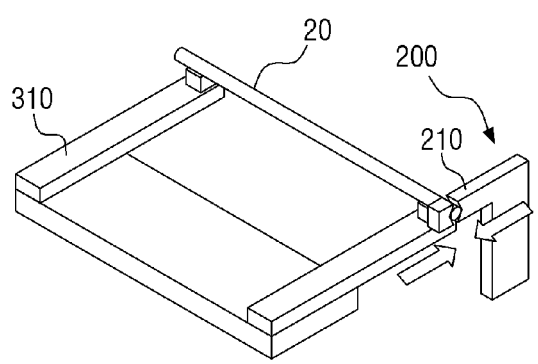
Figure 5:
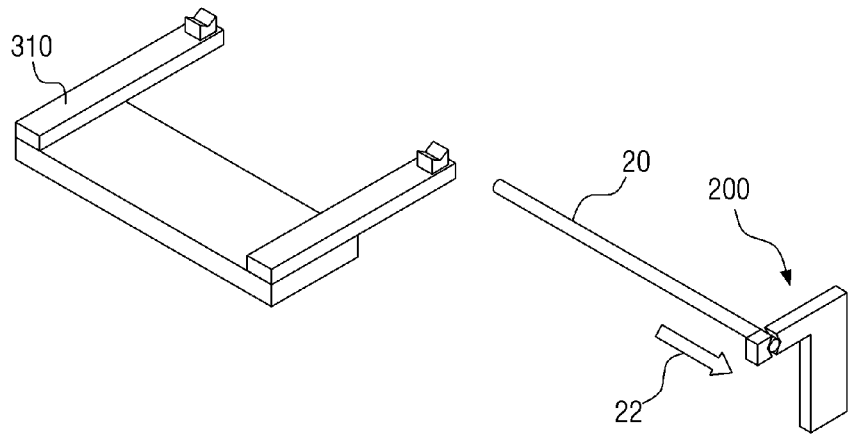

(b) of FIG. 5 illustrates one example of the turn skid 200 disposed at the circular axis collection location. Herein, it may be found that the first circular axis 20 is stored in the first rack master fork 310. In some embodiments, the clamp 210 may fix and secure the first circular axis when the turn skid 200 is disposed at the circular axis collection location.

(c) of FIG. 5 illustrates one example of the turn skid 200 after collecting the first circular axis 20. In some embodiments, when the first circular axis 20 is fixed by the clamp 210, the first movement part may move in the direction of designated location 22.

According to the example described with reference to FIG. 5, it may be understood that the turn skid 200 moves to the circular axis collection location, and it fixes and secures the first circular axis using the clamp 210 and moves back to the designated location.

In addition, it may be understood that the first circular axis in which the article is mounted may be output from the input/output port 100 to the first rack master fork 310 by performing a reverse operation of the operation illustrated in FIG. 5. Furthermore, the third circular axis that has output the article to the input/output port 100 may be output to the third rack master fork.

Figure 6:
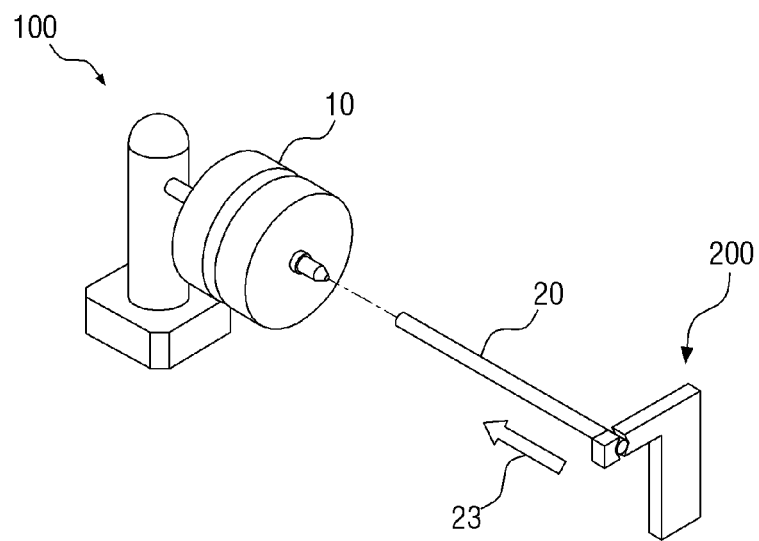
Figure 6:
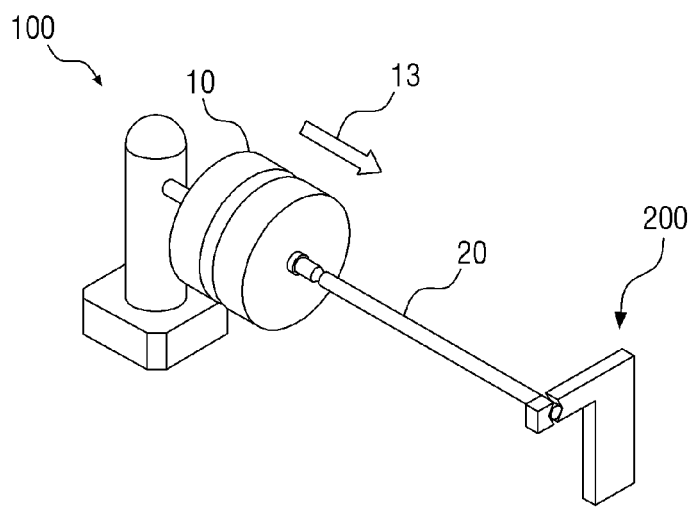

An article collection operation of the turn skid 200 will be described in more detail with reference to FIG. 6. FIG. 6 illustrates one example of the article collecting operation in which the article 10 output from the input/output port 100 is mounted in the first circular axis 20, but an article output operation in which the article mounted in the third circular axis is output to the input/output port may be also understood with reference to FIG. 6.

The turn skid 200 may include a second movement part that moves between the designated location and an article collection location. Referring to (a) of FIG. 6, it may be understood that the second movement part of the turn skid 200 may move in the direction of article collection location 23 from the designated location. In this case, all known techniques may be applied to implement the second movement part. For example, the rails and wheels may be used, but the present disclosure is not limited thereto.

In some embodiments, when the first circular axis 20 is fixed by the clamp 210 and the turn skid 200 is disposed at the designated location, the second movement part may move to the article collection location. According to the present embodiment, the turn skid 200 may move to the article collection location in a state where the first circular axis is fixed by the clamp 210.

(b) of FIG. 6 illustrates one example of a turn skid 200 disposed at the article collection location. Herein, it may be found that the article 10 is stored in the input/output port 100. In this case, as described above in the operation of the first pusher of the input/output port 100, the turn skid 200 may collect the article by outputting the article 10 mounted in the input/output port 100, to the turn skid 200

When the article 10 is mounted in the first circular axis 20 fixed to the turn skid 200, the turn skid 200 may move from the article collection location to the designated location.

According to the example described with reference to FIG. 6, it may be understood that the turn skid 200 moves to the article collection location to collect the article from the first circular axis, and then moves back to the designated location. In addition, the turn skid 200 moves to the article collection location to output the article mounted in the third circular axis, and then moves back to the designated location.

In some embodiments related to the turn skid 200, the turn skid 200 at the discharging of the article may include a second pusher configured to output the article mounted in the third circular axis to the input/output port 100. Since the operation performed by the second pusher is similar to that performed by the first pusher, a description of the operation performed by the second pusher may be easily understood with reference to the description of the first pusher.

According to FIGS. 5 and 6, it may be understood that the turn skid 200 moves to the circular axis collection location, and it fixes and secures the first circular axis using the clamp 210 and moves back to the designated location; the turn skid 200 then moves from the designated location to the article collection location to collect the article from the first circular axis and moves back to the designated location; and the turn skid 200 then moves from the designated location to the circular axis collection location, and it outputs the first circular axis in which the article is mounted to the first rack master fork by using the clamp, and moves back to the designated location.

However, in some embodiments, the turn skid 200 may output the first circular axis in which the article is mounted to the first rack master fork, and the turn skid 200 may fix and secure another circular axis in which the article is not mounted, at the circular axis collection location, instead of moving back to the designated location. According to the present embodiment, any unnecessary movement of the turn skid 200 may be removed.

In some embodiments related to the turn skid 200, the turn skid 200 may include a third sensor configured to sense the number of articles mounted in the first circular axis fixed to the clamp 210, a fourth sensor configured to sense the mounted location of the article mounted in the first circular axis fixed to the clamp, and an arrangement pusher configured to arrange the mounted location of the article mounted in the first circular axis based on a signal of the third sensor and a signal of the fourth sensor. An arrangement operation of the article mounted in the first circular axis according to the present embodiment may be performed after collecting the article 10 from the input/output port 100.

In addition, the third sensor may sensor the number of articles mounted in the third circular axis, the fourth sensor may sensor the mounted location of the articles mounted in the third circular axis, and the arrangement pusher may arrange the mounted location of the articles mounted in the third circular axis based on the signals of the third and fourth sensors. The arrangement operation of the article mounted in the third circular axis according to the present embodiment may be performed before outputting the article 10 to the input/output port 100, but no separate arrangement operation may be required since the article mounted in the third circular axis was already subjected to the arrangement operation while receiving the article.

According to the aforementioned embodiments, the articles mounted in the circular axis may be arranged and stored more safely in the rack shelf. Accordingly, it is possible to prevent safety accidents that may occur in the receiving and discharging operations in advance.

Figure 7:
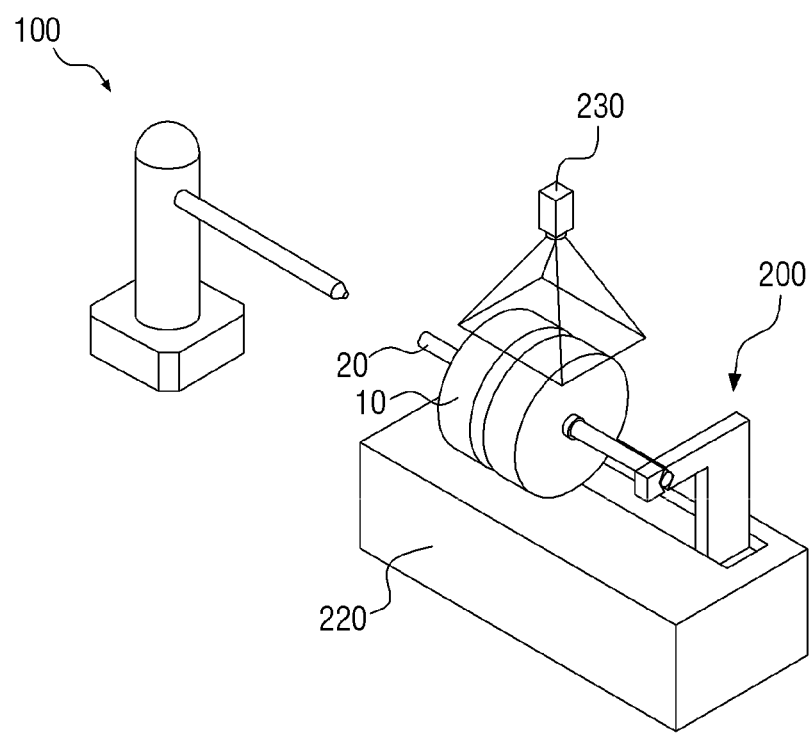

The arrangement operation of the turn skid 200 will be described in more detail with reference to FIGS. 7 and 8. FIG. 7 illustrates an example in which the turn skid 200 is disposed at a designated location along a second movement part 220 after mounting the article 10 on the first circular axis 20 from the input/output port 100. In this case, the article 10 mounted in the first circular axis 20 may be arranged using the third sensor and the fourth sensor included in a first sensor unit 230.

Figure 8:
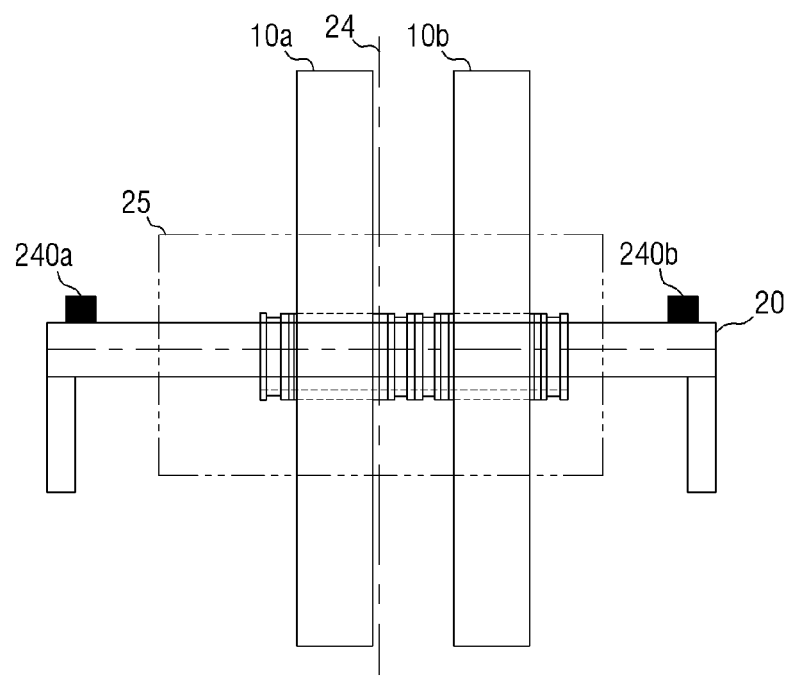
FIG. 8 is a view explaining in more detail an arrangement operation which the turn skid described with reference to FIG. 7 may perform.
Figure 8:
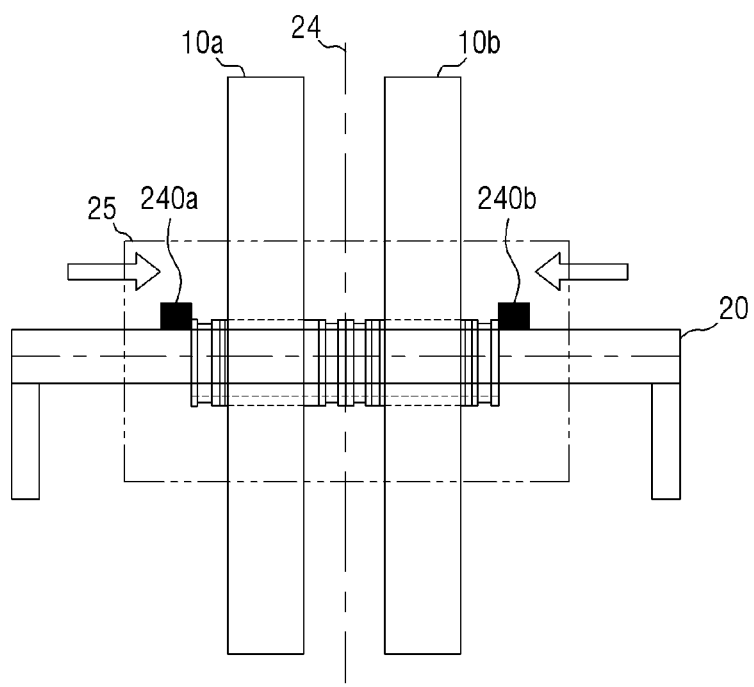

(a) of FIG. 8 illustrates an example in which articles 10a and 10b mounted in the first circular axis 20 are not arranged. Herein, each of the third sensor and fourth sensor included in the first sensor unit 230 may be camera sensors, but the present disclosure is not limited thereto, and any sensor for the purpose of implementing operations of each sensor may be used.

In some embodiments, the first sensor unit 230 may be a sensor configured to sense information on an area of interest 25. In this case, the first sensor unit 230 may transmits a signal associated with the mounted location of the article, the number of articles, and a location of a center line 24 to a controller, so that the controller may control operations of arrangement pushers 240a and 240b.

(b) of FIG. 8 illustrates an example in which the articles 10a and 10b are arranged in the center line 24 by the arrangement pushers 240a and 240b. It may be understood that the first arrangement pusher 240a illustrated in FIG. 8 is fixed at a location analyzed by the controller, and the second arrangement pusher 240b pushes the articles 10a and 10b, thus allowing the articles 10a and 10b to be arranged as illustrated in (b) of FIG. 8.

Even though FIG. 8 illustrates that there are two articles 10a and 10b, this is only for convenience of understanding, and the number of articles mounted in the first circular axis may be changed as needed. It should be noted that the type of articles mounted in the first circular axis may also vary.

Figure 9:
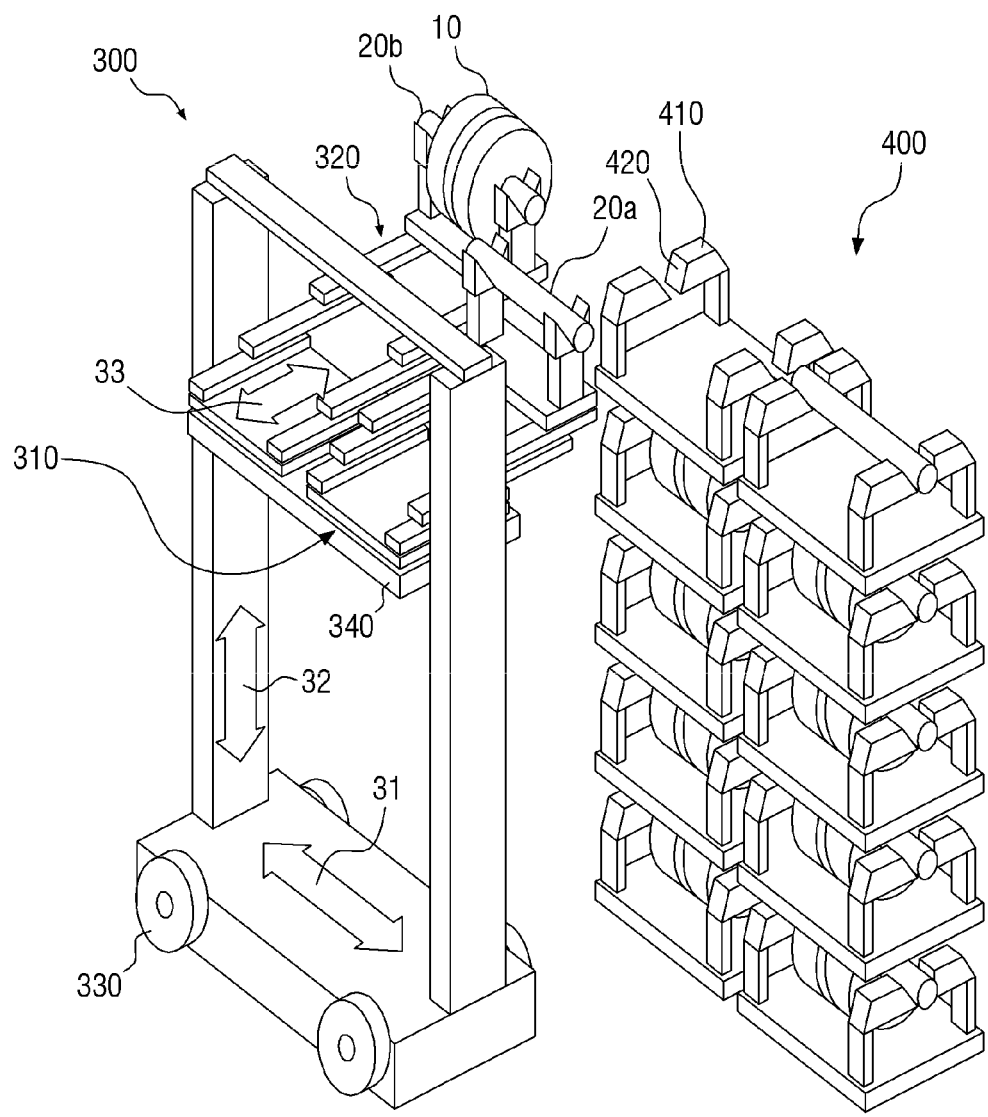
FIG. 9 is a view explaining in more detail a rack master and a rack shelf described with reference to FIG. 1.

FIG. 9 is a diagram for describing the rack master 300 and the rack shelf 400 described with reference to FIG. 1 in more detail. Even though FIG. 9 illustrates that the first rack master fork 310 and the second rack master fork 320 operate as a pair, the present disclosure is not limited thereto, and any number of rack master forks may operate by multiple rack masters 300. In addition, even though FIG. 9 illustrates the first rack master fork 310 and the second rack master fork 320 while receiving the article, referring to FIG. 9, the operations of the third rack master fork and the fourth rack master fork while discharging the article may be understood.

FIG. 9 illustrates an example of the rack master 300 composed of the first rack master fork 310 configured to collect a first circular axis 20a in which the article stored in a target rack 410 is not mounted and the second rack master fork 320 configured to transport a second circular axis 20b in which the article 10 is mounted in the target rack 410 where the first circular axis 20a is collected.

In some embodiments, the collection operation of the first rack master fork 310 and the transport operation of the second rack master fork 320 may be continuously performed. In other words, at the time of receiving the article, the collection operation of the first rack master fork 310 may be preceded, and then the transport operation of the second rack master fork 320 may be subsequently performed. On the other hand, at the time of discharging the article, the collection operation of the third rack master fork configured to collect the third circular axis in which the article is mounted may be preceded, and then the transport operation of the fourth rack master fork configured to discharge the fourth circular axis in which the article is not mounted may be continuously performed.

The rack master 300 may include a vertical movement part 340 configure to vertically move the rack master forks 310 and 320. As the vertical movement part 340 moves the rack master forks 310 and 320 in a vertical direction 32, the rack master 300 may collect and transport the circular axis at a location corresponding to a storage location 420 of each of the plurality of racks included in the rack shelf 400. In this case, all known techniques may be applied to implement the vertical movement part 340. For example, it should be noted that the rails and wheels may be used, but the present disclosure is not limited to this example.

In some embodiments related to the vertical movement part 340, the vertical movement part 340 may move a pair of rack master forks including the first rack master fork 310 and the second rack master fork 320 in the vertical direction 32 at once. According to the present embodiment, the continuous operations of the first rack master fork 310 and the second rack master fork 320 may be efficiently performed by moving the pair of rack master forks in the vertical direction 32 at once.

For example, the first rack master fork 310 is disposed at a location corresponding to the storage location 420 of the target rack 410, and the first circular axis 20a is collected using the first rack master fork 310. Next, the second rack master fork 320 is disposed at a location corresponding to the storage location 420 of the target rack 410, and the second circular axis 20b is transported using the second rack master fork 320. Herein, in order to move each of the rack master forks 310 to a location corresponding to the storage location 420 of the target rack 410, a movement part 330 included in the rack master 300 may be used. Even though FIG. 9 illustrates that the rack master 300 moves in a left-right direction 31 by the movement part 330, the direction in which the rack master 300 moves may vary according to a path provided in the rack shelf 400. In addition, it should be noted that the movement part 33 may be implemented with rails and wheels, but the present disclosure is not limited thereto, and all known configurations capable of moving the rack master 300 may be applied to the movement part 330.

The rack master forks 310 and 320 included in the rack master 300 may extend and contract in a storage-location direction 33. For a more detailed explanation thereof, it will be described with reference to FIG. 10.

Figure 10:
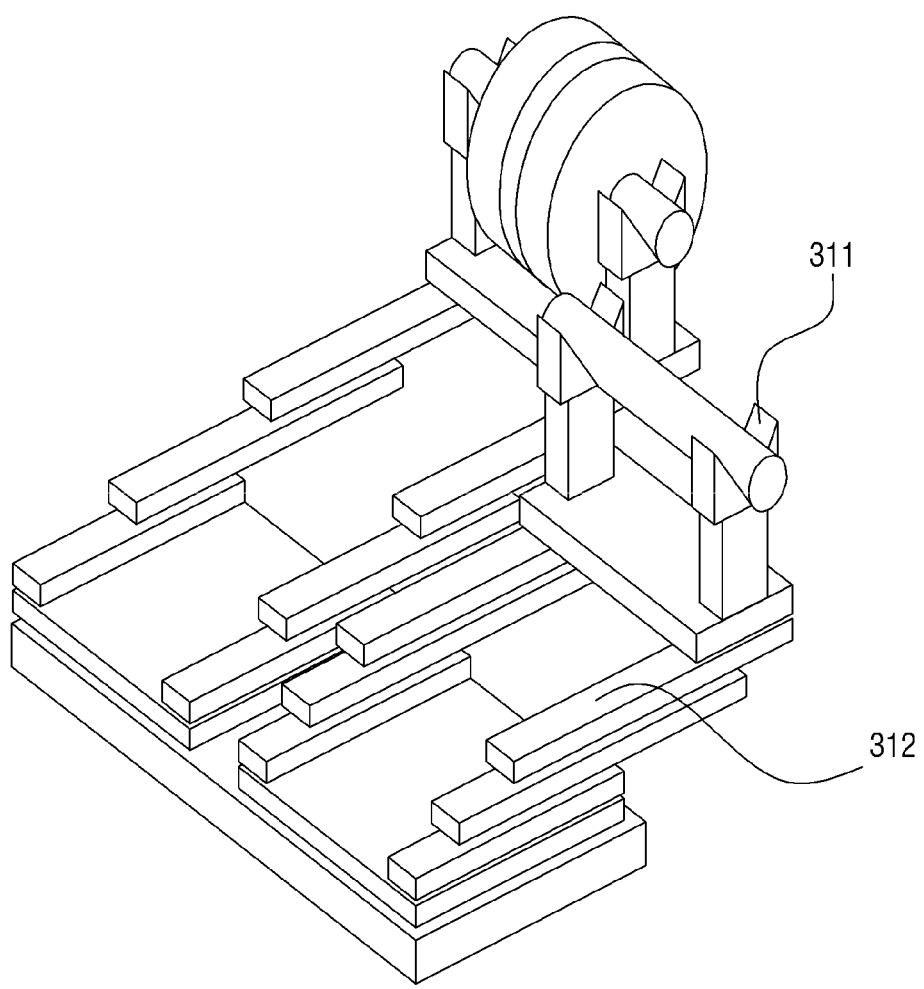
FIG. 10 is a view explaining in more detail a rack master fork of the rack master described with reference to FIG. 9.

FIG. 10 illustrates an example of the rack master fork included in the rack master 300. Even though FIG. 10 shows two rack master forks, it should be noted that this is for convenience of understanding that rack master forks may operate as a pair and does not limit the scope of the present disclosure.

The rack master fork may include a fork 311 in which the circular axis is stored. In some embodiments, the fork 311 may have a V-Block structure. According to the present embodiment, since the fork 311 has the V-Block structure, the circular axis stored in the fork 311 may be prevented from being separated.

The rack master fork may include an extension bar 312 extending integrally to the fork 311 so that the fork 311 moves to a storage location of the rack. It should be noted that all known structures for extension to move the fork 311 to the storage location of the rack may be applied to the extension bar 312.

The rack master fork may include a third movement part separated from the rack master 300 and moving along the path provided in the rack shelf 400. In some embodiments, when the first circular axis stored in the rack is collected in the first rack master fork while receiving the article, the third movement part of the first rack master fork may move to a circular axis collection location along the path provided in the rack shelf 400. In addition, when the third circular axis stored in the rack is collected in the third rack master fork while discharging the article, the third movement part of the third rack master fork may move to the circular axis collection location along the path provided in the rack shelf 400. According to the present embodiment, the first circular axis in which the article is not mounted during the receiving operation may be provided to the turn skid 200, and a third circular axis in which the article is mounted during the discharging operation may be provided to the turn skid 200.

Herein, the second rack master fork that has transported the second circular axis to the rack during the receiving operation may be separated from the rack master 300 and moved to a location corresponding to a storage location of another rack included in the rack shelf 400, thus performing the operation performed by the first rack master fork. Similarly, the fourth rack master fork that has transported the fourth circular axis to the rack during the discharging operation may be separated from the rack master 300 and moved to a location corresponding to the storage location of another rack included in the rack shelf 400, thus performing the operation performed by the third rack master fork. Each operation of the rack master fork included in the cylindrical material storing device according to one embodiment of the present disclosure may be changed by controlling each of the operations of the rack master fork by the controller.

Figure 11:
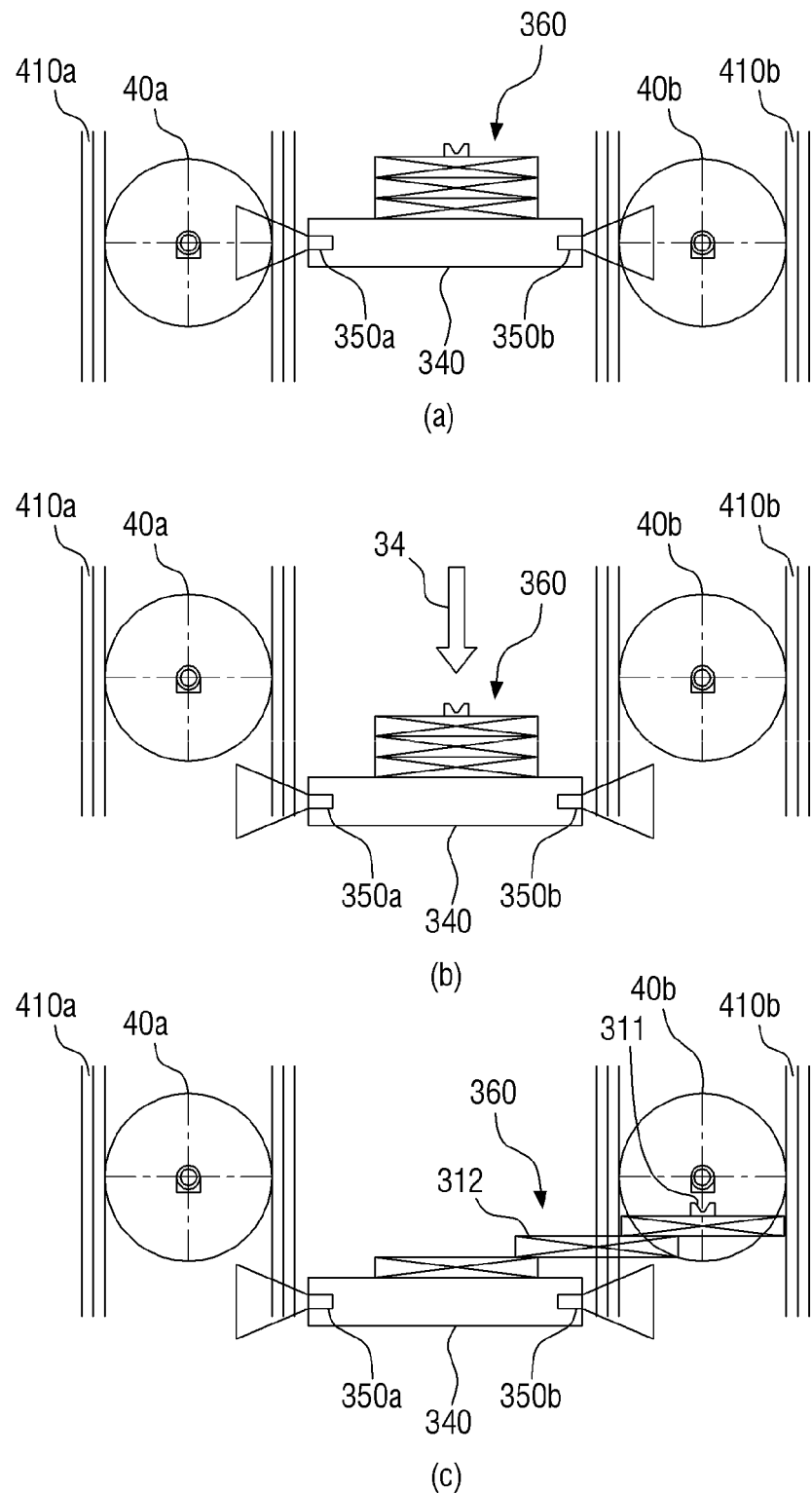
FIG. 11 is a view explaining in more detail an operation which the rack master fork of the rack master described with reference to FIG. 10 may perform.

FIG. 11 is a view explaining in more detail a vertical movement of the rack master 300 and the extension of the extension bar 312 of the rack master fork 360. Even though FIG. 11 illustrates that racks 410a and 410b are provided on both sides of the vertical movement part 340, this is only exemplary and the scope of the present disclosure is not limited thereto.

The rack master 300 illustrated in (a) of FIG. 11 may include second sensor units 350a and 350b. Herein, the second sensor units 350a and 350b may be provided on both sides of the vertical movement part 340 and may sense storage locations of articles 40a and 40b stored in the racks 410a and 410b that are present on both sides of the vertical movement part 340. Furthermore, the second sensor units 350a and 350b may be camera sensors, but the present disclosure are not limited thereto, and any sensor for the purpose of implementing the operations of each sensor may be used.

(a) of FIG. 11 illustrates an example in which the storage locations of the racks 410a and 410b are sensed based on signals of the second sensor units 350a and 350b, and accordingly, the rack master fork 360 is vertically moved to a location corresponding to the storage location using the vertical movement part 340.

(b) of FIG. 11 illustrates an example in which the vertical movement part 340 is moved in a downward direction 34 by a predetermined length after the rack master fork 360 is arranged at the location corresponding to the storage location. Herein, the predetermined length is to easily extend the fork 311 of the rack master fork 360 to the articles 40a and 40b stored in the racks 410a and 410b. In some embodiments, it may be understood that an operation of moving in the downward direction 34 by a predetermined length may be omitted. In addition, the predetermined length may be set differently in advance according to the structure of the extension bar 312.

(c) of FIG. 11 illustrates an example in which the extension bar 312 extends integrally to the fork 311 of the rack master fork 360. In some embodiments, a storage location of the articles 40a and 40b stored in the racks 410a and 410b is sensed based on the signals of the second sensor units 350a and 350b, and accordingly, the extension bar 312 may extend integrally to the fork 311 so that the fork 311 moves to the storage location. According to the present embodiment, the fork 311 may finely move to the storage location based on the signal sensed by the second sensor units 350a and 350b.

So far, the cylindrical material storing device according to an embodiment of the present disclosure has been described with reference to FIGS. 1 to 11. According to the aforementioned device, efficient automated material flow may be realized, unlike a conventional method that relies on the worker's manual labor. In addition, with the realization of the automated material flow, the waste of manpower caused by the manual labor can be reduced, and safety accidents that may occur during the storage and transport of the article can be prevented. Furthermore, the worker may be prevented from touching the article, thereby improving the quality of the final manufactured product using the article.

Figure 12:
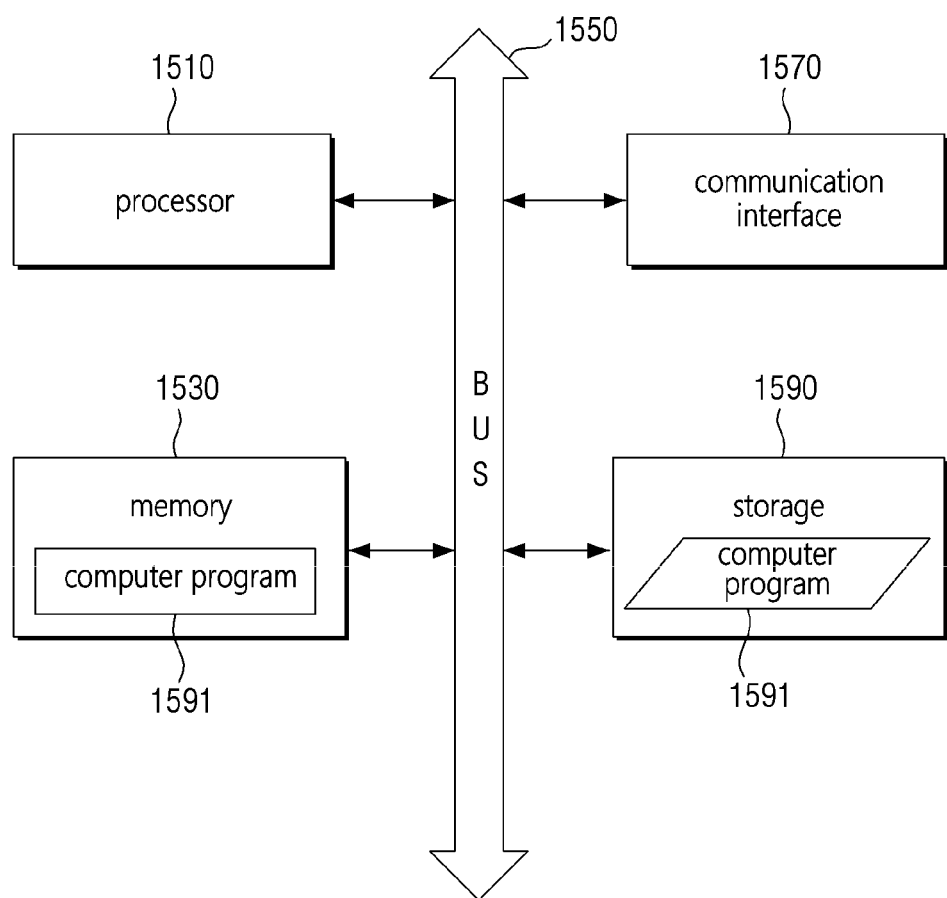
FIG. 12 is an exemplary diagram illustrating a hardware configuration to which the device according to one embodiment of the present disclosure may be applied.

Hereinafter, an exemplary computing device 1500 that is applicable to the cylindrical material storing device according to one embodiment of the present disclosure will be described in more detail with reference to FIG. 12.

A computing device 1500 may include one or more processors 1510, a bus 1550, a communication interface 1570, a memory 1530 configured to load a computer program 1591 by the processor 1510, and a storage 1590 configured to store the computer program 1591. However, FIG. 12 illustrates only components related to the embodiment of the present disclosure. Therefore, it may be found by those skilled in the art to which the present disclosure belongs that other universal components may be further included in addition to the components illustrated in FIG. 12.

The processor 1510 controls overall operations of each component of the computing device 1500. The processor 1510 may include a central processing unit (CPU), a microprocessor unit (MPU), a micro-controller unit (MCU), a graphical processing unit (GPU), or any type of processor known in the technical field of the present disclosure. In addition, the processor 1510 may perform arithmetic operations for at least one application or program for executing the method according to embodiments of the present disclosure. The computing device 1500 may include one or more processors.

The memory 1530 stores different kinds of data, commands, and/or information. The memory 1530 may load one or more programs 1591 from the storage 1590 to execute the method according to the embodiments of the present disclosure. The memory 1530 may be implemented with a volatile memory such as RAM, but the technical scope of the present disclosure is not limited thereto.

The bus 1550 provides a communication function between the components of the computing device 1500. The bus 1550 may be implemented with various types of buses such as an address bus, a data bus, and a control bus.

The communication interface 1570 supports wired/wireless Internet communication of the computing device 1500. In addition, the communication interface 1570 may support a variety of communication methods other than Internet communication. To this end, the communication interface 1570 may include a communication module well known in the technical field of the present disclosure.

According to some embodiments, the communication interface 1570 may be omitted.

The storage 1590 may non-temporarily store one or more programs 1591 and different kinds of data.

The storage 1590 may include non-volatile memories such as a read only memory (ROM), erasable programmable ROM (EPROM), electrically erasable programmable ROM (EEPROM) and flash memory, a hard disk, a removable disk, or any computer-readable recording medium known to the technical field which the present disclosure belongs.

The computer program 1591 may include one or more instructions that cause the processor 1510 to execute the method/operation according to a variety of embodiments of the present disclosure when loaded into the memory 1530. That is, the processor 1510 may perform methods/operations according to a variety of embodiments of the present disclosure by executing the one or more instructions.

In this case, the controller may be implemented in a way that is applicable to the cylindrical material storing device according to one embodiment of the present disclosures via the computing device 1500. Herein, the controller may perform operations performed by the cylindrical material storing device based on the signals of the plurality of sensors constituting the cylindrical material storing device. In addition, the controller may control rotation, extension, and movement of each component constituting the cylindrical material storing device.

In some embodiments, the controller may be implemented with one computing device 1500 in an integral form, but the present disclosure is not limited thereto, and the controller may be implemented by including the computing device 1500 in each of the components constituting the cylindrical material storing device in functional units.

So far, a variety of embodiments of the present disclosure and the effects according to embodiments thereof have been mentioned with reference to FIGS. 1 to 12. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A cylindrical material storing device, comprising:
   an input/output port configured to mount an article in a first circular axis and output the first circular axis;
   a turn skid configured to collect the first circular axis in which the article output from the input/output port is mounted; and
   a rack master including a first rack master fork configured to collect the first circular axis in which the article is mounted from the turn skid, and configured to output the first circular axis to a target rack in which a circular axis is not stored.

2. The cylindrical material sorting device of claim 1, further comprising a rack shelf including one or more racks in which a circular axis is stored.

3. The cylindrical material storing device of claim 1, further comprising:
   an automated guided vehicle configured to output the article to the input/output port.

4. The cylindrical material storing device of claim 1, wherein the input/output port comprises:
   a shaft rotatably coupled to a body in an integral form; and
   a first pusher configured to output the article mounted in the shaft to an automated guided vehicle.

5. The cylindrical material storing device of claim 4, wherein the input/output port comprises:
   a first sensor configured to sense a number of articles mounted in the shaft; and
   a second sensor configured to sense a match between a longitudinal direction of the shaft and a longitudinal direction of the first circular axis,
   wherein the first pusher outputs the article in the shaft to the automated guided vehicle based on a signal of the first sensor and a signal of the second sensor.

6. The cylindrical material storing device of claim 4, wherein the input/output port comprises:
   a second sensor configured to sense a match between a longitudinal direction of the shaft and the longitudinal direction of the shaft of the automated guided vehicle,
   wherein the first pusher outputs the article in the shaft to the automated guided vehicle based on a signal of the second sensor.

7. The cylindrical material storing device of claim 1, wherein the turn skid comprises:
   a first movement part that moves between a designated location and an article collection location; and
   a clamp configured to fix the first circular axis in which the article is mounted.

8. The cylindrical material storing device of claim 7, wherein the first movement part moves to the designated location when the article is mounted to the first circular axis at the article collection location.

9. The cylindrical material storing device of claim 7, wherein the turn skid further comprises:
   a second movement part that moves between a designated location and a circular axis collection location,
   wherein the second movement part moves to the circular axis collection location when the article is mounted to the first circular axis and the turn skid is disposed at the designated location.

10. The cylindrical material storing device of claim 7, wherein the turn skid further comprises:
    a third sensor configured to sense a number of articles mounted in the first circular axis fixed in the clamp;
    a fourth sensor configured to sense a mounted location of the article mounted in the first circular axis fixed in the clamp; and
    an arrangement pusher configured to arrange the mounted location of the article mounted in the first circular axis, based on a signal of the third sensor and a signal of the fourth sensor.

11. The cylindrical material storing device of claim 1, wherein the first rack master fork transported the first circular axis to the target rack separates from the rack master and moves to a location corresponding to a storage location of a rack that is different from the target rack.

12. The cylindrical material storing device of claim 11, wherein the first rack master fork separated from the rack master collects a second circular axis stored on the rack and an article is not mounted, and outputs the second circular axis to the turn skid.

13. The cylindrical material storing device of claim 1, wherein the rack master further comprises:
    a vertical movement part configured to vertically move the first rack master fork; and
    a fifth sensor configured to sense a storage location of a rack, and
    the vertical movement part vertically moves the first rack master fork based on a signal of the fifth sensor.

14. The cylindrical material storing device of claim 2, wherein the first rack master fork comprises:
    a fork in which the circular axis is stored;
    an extension bar extending integrally to the fork so that the fork moves to a storage location of a rack; and
    a third movement part that moves along a path provided in the rack shelf.

15. The cylindrical material storing device of claim 14, wherein the rack master further comprises a sixth sensor configured to sense the storage location of the rack, and
    the extension bar extends integrally to the fork so that the fork moves to the storage location, based on a signal of the sixth sensor.

16. A cylindrical material storing device, comprising:
    an input/output port configured to collect an article from a third circular axis and output the third circular axis;
    a turn skid configured to collect the third circular axis in which the article output to the input/output port; and
    a rack master including a first rack master fork configured to collect the third circular axis in which the article is not mounted from the turn skid, and configured to output the third circular axis to a target rack in which a circular axis is not stored.

17. The cylindrical material storing device of claim 16, further comprising: a rack shelf including one or more racks in which a circular axis is stored.

18. The cylindrical material storing device of claim 16, further comprising:
    an automated guided vehicle configured to output the article to the input/output port.

19. The cylindrical material storing device of claim 16, wherein the first rack master fork transported the third circular axis to the target rack separates from the rack master and moves to a location corresponding to a storage location of a rack that is different from the target rack.

20. The cylindrical material storing device of claim 19, wherein the first rack master fork separated from the rack master collects a second circular axis stored on the rack and an article is mounted, and outputs the second circular axis to the turn skid.

* * * * *